United States Patent Office 3,553,240
Patented Jan. 5, 1971

3,553,240
PROCESS FOR THE PREPARATION OF MONO-ARYLLEADTRIACYLATES AND DIARYLLEAD-DIACYLATES
Louis C. Willemsens, Utrecht, Netherlands, assignor to International Lead Zinc Research Organization, Inc., New York, N.Y., a corporation of New York
No Drawing. Continuation-in-part of application Ser. No. 704,247, Feb. 9, 1968. This application Oct. 23, 1968, Ser. No. 770,124
Claims priority, application Netherlands, Mar. 20, 1967, 6704140
Int. Cl. C07f 7/24; C11c 1/00
U.S. Cl. 260—436                                      10 Claims

ABSTRACT OF THE DISCLOSURE

A process for preparing monoarylleadtriacylates and diarylleaddiacylates from leadtetraacylate and triarylleadacylate or tetraryllead in a liquid organic medium with mercury diacylate as a catalyst.

---

This application is a continuation-in-part application of copending application Ser. No. 704,247, filed Feb. 9, 1968, and now abandoned. The invention relates to a process for preparing monoarylleadtriacylates and diarylleaddiacylates.

The known methods for preparing monoarylleadtriacylates and diarylleaddiacylates are inefficient, requiring expensive reactants.

It is therefore a object of this invention to provide an efficient and less expensive method for preparing monoarylleadtriacylates and diarylleaddiacylates.

According to one aspect of the invention, three moles of lead tetraacylate, $Pb(OAc)_4$, in which OAc represents an organic acylate radical are reacted with one mole of tetraryllead, $Ar_4Pb$, in which Ar represents an aryl radical in a liquid organic medium under the influence of a mercury diacylate, $Hg(OAc)_2$ as a catalyst to form a monoarylleadtriacylate product, $ArPb(OAc)_3$.

According to a second aspect of the invention, two moles of lead tetraacylate, $Pb(OAc)_4$, are reacted with one mole of triarylleadacylate, $Ar_3PbOAc$, in a liquid organic medium under the influence of a mercury diacylate, $Hg(OAc)_2$ as a catalyst to form a monoarylleadtriacylate, $ArPb(OAc)_3$.

According to a third aspect of the invention, one mole of leadtetraacylate, $Pb(OAc)_4$, is reacted with one mole of tetraryllead, $Ar_4Pb$, in a liquid organic medium under the influence of a mercury diacylate, $Hg(OAc)_2$, as a catalyst, to form a diarylleaddiacylate, $Ar_2Pb(OAc)_2$.

According to a fourth aspect of the invention, one mole of leadtetraacylate, $Pb(OAc)_4$, is reacted with two moles of triarylleadacylate, $Ar_3PbOAc$, in a liquid organic medium under the influence of a mercury diacylate, $Hg(OAc)_2$, to form a diarylleaddiacylate, $Ar_2Pb(OAc)_2$.

These reactions may be visualized as follows:

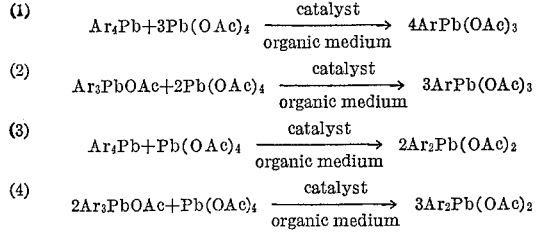

The influence of the acylate group on the course of the redistribution reaction is hardly measurable. Therefore, virtually any acid radical may be used with success. The acylate radicals of acetic acid, propionic acid, isobutyric acid, benzoic acid, lauric acid and the like are of significant commercial interest and are illustrations of the broad scope of acyl radicals which may be employed in the process. In general, acyl radicals containing between one and twenty-two carbon atoms are operable.

As to the aryllead radical, all aryl radicals that will attach to lead can be used. Mono- and dicarbocyclicaryl radicals ranging to 32 carbon atoms are most notably employble, with special consideration given to the phenyl, tolyl and naphthyl groups, both substituted and unsubstituted. The aryl radicals may be substituted with any of the common aryl substituents, such as alkyl, nitro, sulfonyl, amino, alkoxy, alkanoyloxy, and halide radicals, as well as others.

The liquid organic solvent for use in the process includes hydrocarbons, such as the aliphatic, cycloaliphatic, and aromatic hydrocarbons which may or may not be halogenated. Other compounds which are employable include ethers, carboxylic acids and cyclic compounds. It has been found that the following solvents provide good results: hexane, heptane, petroleum hydrocarbons, chloroform, methylenechloride, dichloroethane, bromoform, benzene, toluene, xylene, decaline, tetraline, cyclohexane, diethylether, isopropylether, dioxane, tetrahydrofuran, acetic acid, isobutyric acid, sulfolan, organic acids of the formula HOAc, and the like.

In general, stoichiometric quantities of the reactants will react with each other. A slight stoichiometric excess of one of the reactants over the other may be used, but an excess may lead to the formation of other compounds and complicate the purifiaction process.

The use of a mercury diacylate as a catalyst is necessary in order to obtain high yields. Moreover, without the presence of the diacylate, the lead in the reactants dissipates into many side-products which makes the isolation of the desired product increasingly difficult. The preferred quantity of mercury diacylate catalyst is from 0.05 to 20 moles per 100 moles of the quantity of leadtetraacylate brought into reaction.

The concentrations of the reactants and catalyst in the liquid hydrocarbon solvent are not critical. In view of the requirements of solubility, 0.01% to 20% by weight of the reactants calculated on the quantity of solvent is preferred.

The temperature of the reaction is limited by the boiling temperature of the liquid solvent, of course, and will in most cases have a maximum of approximately 100° C. If glacial acetic acid is used as the solvent, for example, it is desirable that the temperature range lie between 15° C. and 100° C., preferably between 65° C. and 80° C.

In preparing the most common acylate, i.e., the acetate, glacial acetic acid is preferred as the liquid organic solvent. In this instance it is also possible to form the leadtetraacetate in situ by introducing red lead with a stoichiometric quantity of acetic acid anhydride into the glacial acetic acid. After the leadtetraacetate has formed it may then be reacted with tetraryllead or triarylleadacetate to form the monoarylleadtriacetate or the diarylleaddiacetate.

In order to separate the lead products from the reaction mixture when the reaction is completed, the solvent may be evaporated and the residue extracted using suitable solvent, for example dry ethylether or ethylacetate. The yields calculated on lead are on the order of 60% to 80% in $ArPb(OAc)_3$, and 90% to 95% in $Ar_2Pb(OAc)_2$.

The reaction time will vary with the reactants used and with the desired yield. Reaction times varying from 24 to 48 hours for monoarylleadtriacylates and ½ to 12 hours for diarylleaddiacylates have resulted in excellent yields.

The following examples are intended to illustrate the

EXAMPLE I

Tetraphenyllead (0.1 grammole), leadtetraacetate (0.36 grammole) and mercury diacetate (0.01 mole) were kept in 1 litre of glacial acetic acid at 70° C. for 24 hours. The excess of leadtetraacetate was reacted with ethyleneglycol to form leaddiacetate. After evaporation and extraction with dry diethylether, phenylleadtriacetate was precipitated as hydrate with a little water in a yield of 78% calculated on the lead brought to reaction with a melting point of 77°–86° C.

EXAMPLE II

Tetraphenyllead (0.1 grammole) and lead tetraacetate (0.36 grammole) were heated in 500 ml. of glacial acetic acid at 70° C. during 24 hours. When a small portion was processed, 21% of diphenylleaddiacetate, 38% of phenylleadtriacetate and 25% of leadtetraacetate were isolated. In order to terminate reaction, mercurydiacetate (0.01 mole) was added, and heating at 70° C. was effected for another 24 hours. Processing as in Example I resulted in a 70% yield in phenylleadtriacetate.

EXAMPLE III

Red lead (0.25 grammole) was stirred into a mixture of 300 ml. of glacial acetic acid and 102 g. of acetic acid anhydride (1 grammole). The mixture was kept at 60° C. during 1 hour. After that, triphenylleadacetate (0.1 mole) and mercurydiacetate (0.006 mole) were added and heating was effected at 75° C. for 24 hours. Processing as in Example I resulted in a 72% yield in phenylleadtriacetate.

EXAMPLE IV

Tri-p-tolylleadacetate (0.1 grammole), leadtetraacetate (0.22 grammole) and mercurydiacetate (0.006 grammole) were heated in 500 ml. of glacial acetic acid during 20 hours. After processing as in Example I, an 86% yield in p-tolylleadtriacetate hydrate was obtained with a melting point of 86°–88° C.

EXAMPLE V

Tetraphenyllead (0.1 mole), leadtetraacetate (0.33 mole) and mercurydiacetate (0.01 mole) were heated at 70° C. in 250 ml. of isobutyric acid during 45 hours. After this, the mixture showed a negative reaction to leadtetraacetate. The isobutyric acid was distilled off in vacuum (0.1 mm.) and the residue was recrystallized from cyclohexane. The yield in phenylleadtriisobutyrate was 60% with a melting point of 75° C.

EXAMPLE VI (a) With catalyst.—Tetraphenyllead (5.15 g., 10 mmole), 4.45 g. lead tetraacetate (10 mmole) and 0.095 g. mercury diacetate (0.3 mmole) were heated 2 hours at 70° C. in 40 ml. acetic acid. After evaporation to dryness the residue was recrystallized from acetone to give 8.9 g. diphenyllead diacetate (18.6 mmole, 93%).

(b) Without catalyst.—A similar reaction, however with mercury diacetate, was carried out. After cooling down the reaction mixture, some lead tetraacetate crystallized out and was filtered off (1.3 g., 2.9 mmole). The mother liquor was evaporated to dryness and the residue extracted with chloroform, lead diacetate (2.0 g., 6.2 mmole) remaining behind. Evaporation of the extract gave 4.4 g. diphenyllead diacetate (9.2 mmole; 46% based on total lead).

EXAMPLE VII (a) With catalyst.—A similar reaction as described in Example VI(a) betwen 9.95 g. triphenyllead acetate (20 mmole), 4.45 g. lead tetraacetate (10 mmole) and 0.095 g. mercury diacetate (0.3 mmole) in 60 ml. acetic acid produced 13.1 g. diphenyllead diacetate (27.3 mmole, 91%).

(b) Without catalyst.—After a similar reaction, however without mercury diacetate, work-up as described in Example VI(b) gave: 1.0 g. lead tetraacetate (2.3 mmole), 2.2 g. lead diacetate (6.8 mmole), and 9.0 diphenyllead diacetate (18.8 mmole); 65% based on total lead.

EXAMPLE VIII

Red lead $Pb_3O_4$ (171 g., 0.25 grammole) was stirred into a mixture of 300 ml. glacial acetic acid and 102 g. of acetic anhydride (1 grammole).

The mixture was kept at 60° C. during 1 hour. After that a stoichiometric quantity of triphenylleaddiacetate and 0.01 mole of mercury diacetate were added and heating was effected at 70° C. for 2 hours. Processing as in Example VI resulted in a 92% yield in diphenyllead diacetate.

EXAMPLE IX

Tetra-p-tolyllead (10 mmole), leadtetraisobutyrate (10 mmole) and 0.2 mole mercury oxide were heated 2 hours at 70° C. in isobutyric acid. Processing as in Example VI resulted in a 90° yield in di-p-tolylleaddiisobutyrate.

I claim:

1. A process for preparing aryllead acylates, comprising mixing leadtetraacylate with a compound selected from the group consisting of triarylleadacylate and tetraaryllead in a liquid organic solvent employing mercury diacylate as a catalyst, to form monoarylleadtriacylate or diarylleaddiacylate.

2. A process as set forth in claim 1 wherein three moles of leadtetraacylate are reacted with one mole of tetraaryllead to form a monoarylleadtriacylate.

3. A process as set forth in claim 1 wherein two moles of leadtetraacylate are reacted with one mole of triarylleadacylate to form a monoarylleadtriacylate.

4. A process as set forth in claim 1 wherein one mole of leadtetraacylate is reacted with one mole of tetraaryllead to form diarylleaddiacylate.

5. A process as set forth in claim 1 wherein one mole of leadtetraacylate is reacted with two moles of triarylleadacylate to form diarylleaddiacylate.

6. A process as set forth in claim 1 wherein the acylate radical is acetate.

7. A process as set forth in claim 6 wherein the solvent is acetic acid.

8. A process as set forth in claim 7 wherein $Pb_3O_4$ is mixed with acetic anhydride to form leadtetraacetate in situ.

9. A process as set forth in claim 1 wherein the aryl radical is phenyl.

10. A process as set forth in claim 1 wherein the amount of mercurydiacylate catalyst employed is from 0.05 to 20 mole percent of catalyst calculated upon the number of moles of leadtetraacylate entering into the reaction.

References Cited

UNITED STATES PATENTS 3,417,113  12/1968  Overmars _____ 260—437X

OTHER REFERENCES

Willemsens: Organolead Chemistry, International Lead Zinc Research Organization (1964), pp. 50 and 51.
Chemical Abstracts, vol. 50 (1956), p. 7728d.
Willemsens et al.: J. Organometallic Chem., vol. 13, (1968), p. 357.

TOBIAS E. LEVOW, Primary Examiner

H. M. S. SNEED, Assistant Examiner

U.S. Cl. X.R.

260—414, 437